US007067001B2

(12) United States Patent
Fraser

(10) Patent No.: US 7,067,001 B2
(45) Date of Patent: Jun. 27, 2006

(54) DRAINAGE COMPOSITION AND USES THEREOF

(76) Inventor: Christopher George Fraser, 235 Quinzeh Creek Rd., Logan Village (AU) 4207

( * ) Notice: Subject to any disclaimer, the term of this patent is extended or adjusted under 35 U.S.C. 154(b) by 0 days.

(21) Appl. No.: 10/512,352

(22) PCT Filed: Apr. 22, 2003

(86) PCT No.: PCT/AU03/00475

§ 371 (c)(1), (2), (4) Date: Mar. 15, 2005

(87) PCT Pub. No.: WO03/089384

PCT Pub. Date: Oct. 30, 2003

(65) Prior Publication Data

US 2005/0150429 A1 Jul. 14, 2005

(30) Foreign Application Priority Data

Apr. 22, 2002 (AU) .................................... PS1894

(51) Int. Cl.

| | |
|---|---|
| ***C04B 28/00*** | (2006.01) |
| ***C04B 30/02*** | (2006.01) |
| ***E02D 29/02*** | (2006.01) |
| ***E01C 3/06*** | (2006.01) |

(52) U.S. Cl. ..................... 106/708; 106/705; 106/706; 106/709; 106/DIG. 1

(58) Field of Classification Search ................ 106/705, 106/708, 709, 802, 706, DIG. 1

See application file for complete search history.

(56) References Cited

U.S. PATENT DOCUMENTS

| | | | | |
|---|---|---|---|---|
| 3,834,916 | A * | 9/1974 | Kesler | 106/644 |
| 6,461,424 | B1 * | 10/2002 | Ramme et al. | 106/709 |
| 6,821,336 | B1 * | 11/2004 | Ramme et al. | 106/709 |

FOREIGN PATENT DOCUMENTS

| | | | | |
|---|---|---|---|---|
| DE | 100 04 237 | A1 | | 8/2001 |
| EP | 0 032 421 | B2 | | 7/1981 |
| EP | 0 710 633 | B1 | | 5/1996 |
| FR | 2 783 848 | A1 | | 3/2000 |
| JP | 59-088352 | A | * | 5/1984 |
| JP | 2-124753 | A | * | 5/1990 |
| WO | WO 2000/052272 | A1 | | 9/2000 |

* cited by examiner

*Primary Examiner*—Anthony J. Green
(74) *Attorney, Agent, or Firm*—Tarolli, Sundheim, Covell & Tummino L.L.P.

(57) ABSTRACT

A drainage composition comprising 1000 to 1500 kg/m3 of aggregate; 100 to 350 kg/m3 of cement; 0 to 100 kg/m3 of fly ash; and 0.2 to 0.6 kg/m3 of fibrous material.

10 Claims, 8 Drawing Sheets

DRAINAGE COMPOSITION AND USES THEREOF

RELATED APPLICATIONS

This application corresponds to PCT Int'l Appln. PCT/AU03/00475, filed Apr. 22, 2003, and claims priority to Australian Provisional Patent Appln. Ser. No. PS 1894, filed Apr. 22, 2002, the subject matter of which is incorporated herein by reference.

FIELD OF THE INVENTION

This invention relates to a drainage composition and uses thereof. In particular, the invention relates to providing drainage for a retaining wall. However, it should be appreciated that the drainage composition may be used for other drainage purposes.

BACKGROUND OF THE INVENTION

Retaining walls are a common method of retaining soil. The requirements of a functional retaining wall are structural stability and durability against the exposed environment and the provision of drainage.

To complete a retaining wall, typically earth is excavated, a block wall or concrete wall is erected, gravel is bagged and stacked adjacent the block wall, weep holes are located in the wall at various locations along the length of the wall, pipes are located through the weep holes to drain any water that passes through the gravel to the base of the wall, and the excavated soil is placed behind the retaining wall.

It is important that the drainage system functions correctly as retaining walls are rarely designed to withstand ponded water pressure. Ponded water pressure can triple or quadruple the loading on the retaining wall if allowed to develop. Often this additional pressure will cause the retaining wall to fail with serious consequences.

The stacked bags of gravel located behind the wall provide a drainage system. However, sometimes a bag may split. The pressure of the earth then spreads the earth through the gravel preventing water from flowing through the gravel reducing the efficiency of the drain. If many bags spit then ponded water may occur which is undesirable.

Another problem with using bagged gravel is that it is very time consuming to produce the drainage system. Gravel must be individually placed into bags by shovelling the gravel into a bagging machine. The bags must then be stacked on top of each other. The making and placing of the bags of gravel usually take considerably more time than the construction of the block wall.

OBJECT OF THE INVENTION

It is an object of the invention to overcome or alleviate the aforementioned disadvantages or provide the consumer with a useful or commercial choice.

SUMMARY OF THE INVENTION

In one form, though not necessarily the broadest or only form, the invention resides in a drainage composition comprising:

1000 to 1500 kg/m$^3$ of aggregate;

100 to 350 kg/m$^3$ of cement;

0 to 100 kg/m$^3$ of fly ash; and 0.5 to 0.6 kg/m$^3$ of fibrous material.

The size of the aggregate typically varies from between 10 mm and 75 mm aggregate. Different sized aggregates may be combined in the drainage composition.

Preferably, the volume of aggregate to fly ash mixed according to approximately the ratio of 3:1.

The fibrous material may be fibre. Normally the synthetic fibre is a nylon fibre. The nylon fibre may be between 19 mm to 50 mm long. Preferably, the amount of fibrous material used is between 0.4 to 0.6 kg/m$^3$.

The drainage composition may be made into blocks, panels or may be poured freely such as in the case of a slab.

The drainage composition may be formed adjacent other structures such as panels or blocks.

Sand may be added to the composition. The weight of sand may between 40 to 200 kg/m$^3$.

In another form, although not necessarily the broadest or only form, the invention resides in a retaining wall comprising:

a load bearing structure to retain earth; and a drainage structure located adjacent said load bearing structural;

wherein water is able to flow through said drainage structure.

The load bearing structure may be in the form of blocks or panels and/or may be poured freely to form a load-bearing wall.

The drainage structure may be formed from blocks, panels and/or poured freely.

The load being structure and drainage structure may be contiguous.

A geofabric may be located adjacent said drainage structure.

In another form, although not necessarily the broadest or only form, the invention resides in a roadway comprising:

a road contact layer on which traffic travels and a drainage layer located adjacent said road contact layer;

wherein water is able to flow through said drainage layer.

The road contact surface is normal tar, asphalt, concrete or the like material. It is usually laid directly onto the drainage layer.

The drainage layer may be formed from blocks, panels and/or poured freely.

A geofabric may be located adjacent said drainage structure.

In another form, the invention resides in erosion prevention system comprising:

a drainage structure;

soil located on top of said drainage structure; and a multiplicity of plants located within said soil wherein a root system of said plants passes through the soil and extends into said drainage structure.

The drainage structure is usually preformed blocks or panels. However, the drainage structure may be laid in situ.

Typically, the plants that are used are a form of grass.

In another form, the invention resides in a weir comprising:

a drainage wall that forms a dam to capture water, said drainage wall allowing water to pass through said wall; and a filter material located adjacent said drainage wall to filter impurities located within said water.

The drainage wall is usually constructed from preformed blocks or panels. However, the drainage composition may be laid in situ.

The filter material may be a geotextile.

In another form, the invention resides in a block comprising:

a face layer and a drainage layer, said face layer being integrally formed with said drainage layer.

The face layer may be formed from concrete, sandstone, clay or the like materials.

Typically, said face layer is thinner than said drainage layer.

In one form, though not necessarily the broadest or only form, the invention resides in a drainage composition comprising:

1000 to 1500 kg/m$^3$ of aggregate;

100 to 350 kg/m$^3$ of cement;

0 to 100 kg/m$^3$ of fly ash; and 5 to 100 kg/m$^3$ of metal filament material.

Preferably, the metal filament material is steel. More preferably, the steel is stainless steel.

BRIEF DESCRIPTION OF THE DRAWINGS

Embodiments of the invention, by way of example only will now be described with reference to the accompanying drawings in which.

DETAILED DESCRIPTION OF PREFFERED EMBODIMENTS

Figure 1:
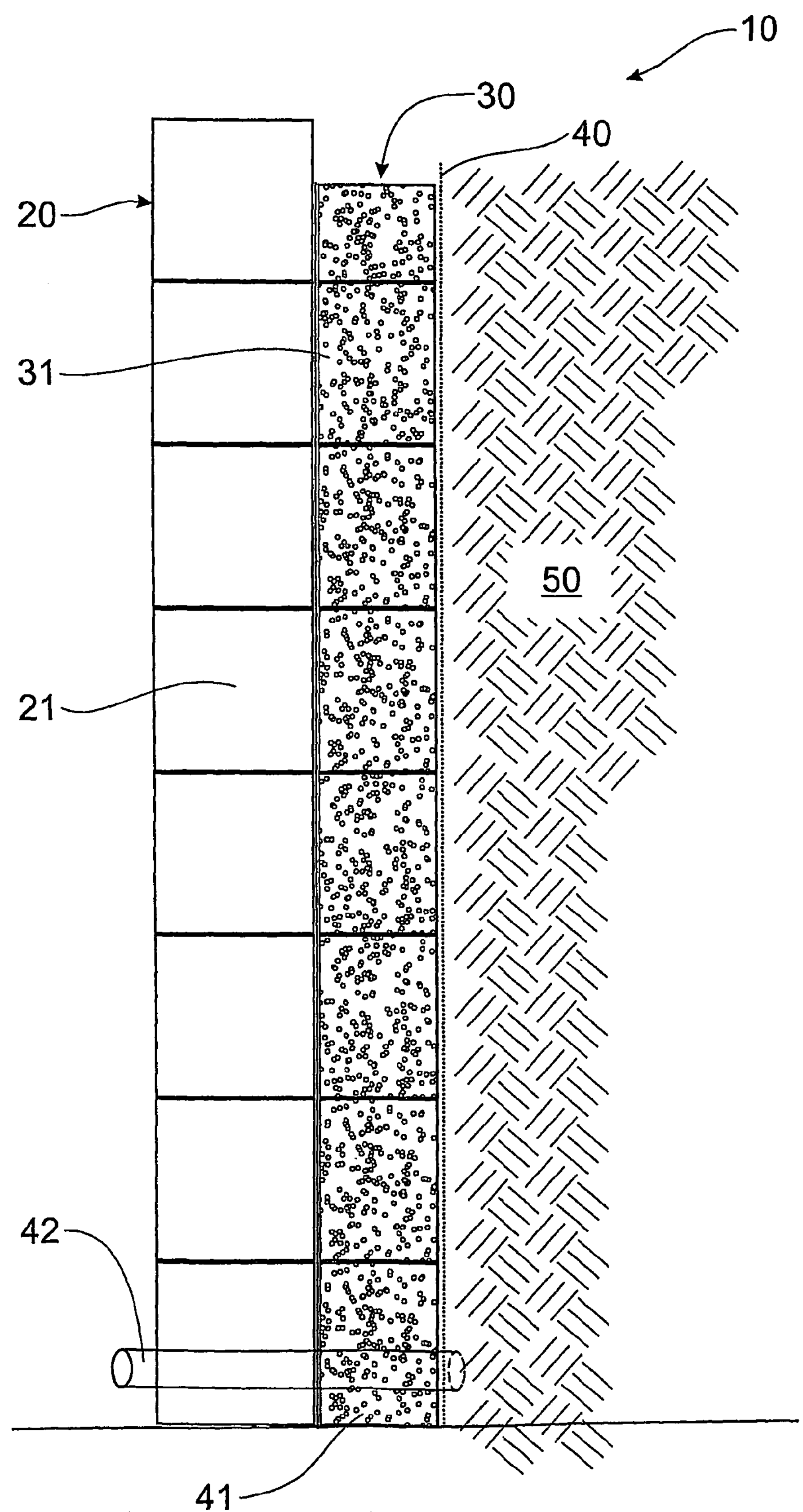
FIG. 1 a sectional side view of a retaining wall according to a first embodiment of the invention.

FIG. 1 shows a retaining wall 10 comprising a load bearing structure 20, drainage structure 30 and a length of geofabric 40.

The loading bearing structure 20 is constructed from a series of concrete blocks 21. A weep hole (not shown) is located in approximately 10 percent of the concrete blocks 21. It should be appreciated that the loading bearing structure is known and that a person skilled in the art would be aware of the techniques needed to produce the load bearing structure.

The drainage structure 30 has been constructed from a series of drainage blocks 31. Each drainage block 30 has been produced from a drainage composition that uses the following ratio of components:

1200 kg/m$^3$ of 20 mm aggregate;

220 kg/m$^3$ of cement;

60 kg/m$^3$ of fly ash; and 0.4 kg/m$^3$ of fibrous material.

The composition was mixed with water in a standard manner and solid drainage blocks 31 of dimensions of 600 mm×300 mm×300 mm were produced using standard techniques. The drainage blocks 31 produced allowed water to flow through them. A weep hole 41 was produced in approximately every 10 percent of the drainage blocks 31.

The retaining wall was constructed by firstly excavating earth 50 adjacent to where the retaining wall was to be placed. The first two rows of concrete blocks 21 were then laid and attached to each other using mortar. The drainage blocks 31 were then laid without the use of mortar. Pipes 42 were located through the weep holes 41 along the length of the retaining wall 10. Geofabric 40 was placed under the first course of drainage blocks to hold it in position. The excavated earth 50 was then back filled. This process was repeated until the retaining wall 10 was completed.

The drainage blocks 31 are porous. Hence any water that travels through the earth 50 passes through the geofabric, through the drainage blocks 31 until the water finally passes through the respective pipes 42. The geofabric prevents the earth 50 from directly contacting the drainage blocks 31 and thereby reducing their effectiveness by partially blocking holes located within drainage blocks 31.

The time saved by using the drainage blocks 31 is substantial. Further, the drainage blocks 31 resist deterioration increasing the overall lifespan of the retaining wall 10.

The drainage blocks 21 of FIG. 1 were also produced from a drainage composition that uses the following ratio of components:

1200 kg/m$^3$ of 20 mm aggregate;

220 kg/m$^3$ of cement;

60 kg/m$^3$ of fly ash; and 20 kg/m$^3$ of stainless steel filament material.

The blocks that were produced were of substantially the same characteristics and performed substantially the same function as the blocks made with nylon fibres.

Figure 2:
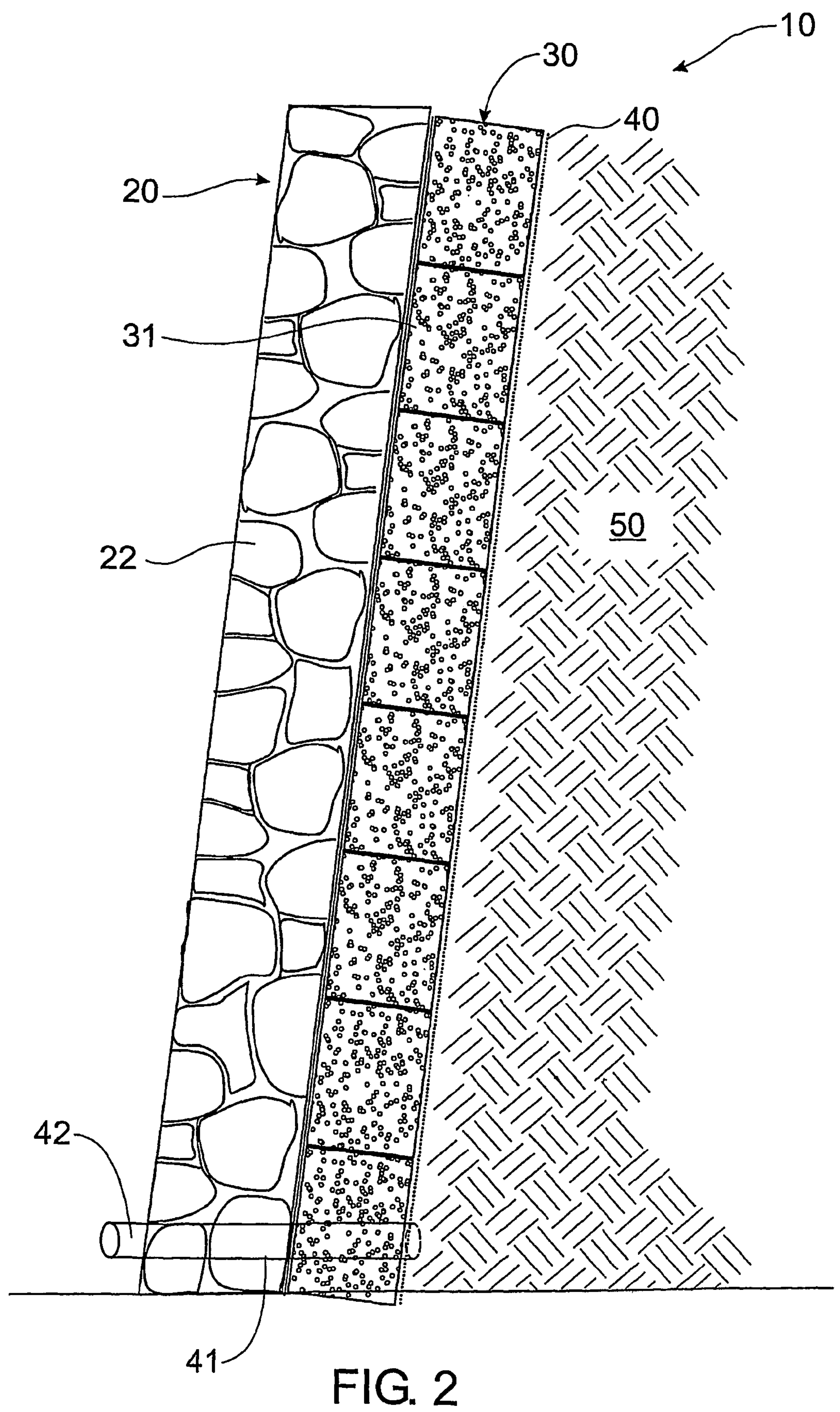
FIG. 2 is a sectional side view of a retaining wall according to a second embodiment of the invention.

FIG. 2. shows a similar type of retaining wall as disclosed in FIG. 1. However, the concrete blocks 21 have been replaced by stones 22 adhered together with mortar. The mortar also adheres the stones 22 to the drainage blocks 31 to form an integral retaining wall 10. This increases the overall strength of the retaining wall 10.

FIG. 3 again shows a similar retaining wall to that disclosed in FIG. 1. In this embodiment, drainage panels 32 have replaced the drainage blocks 31.

The drainage panels 22 were constructed from a drainage composition that uses the following ratio of components:

1200 kg/m$^3$ of 10 mm aggregate;

230 kg/m$^3$ of cement;

45 kg/m$^3$ of fly ash; and 0.45 kg/m$^3$ of fibrous material.

Figure 3:
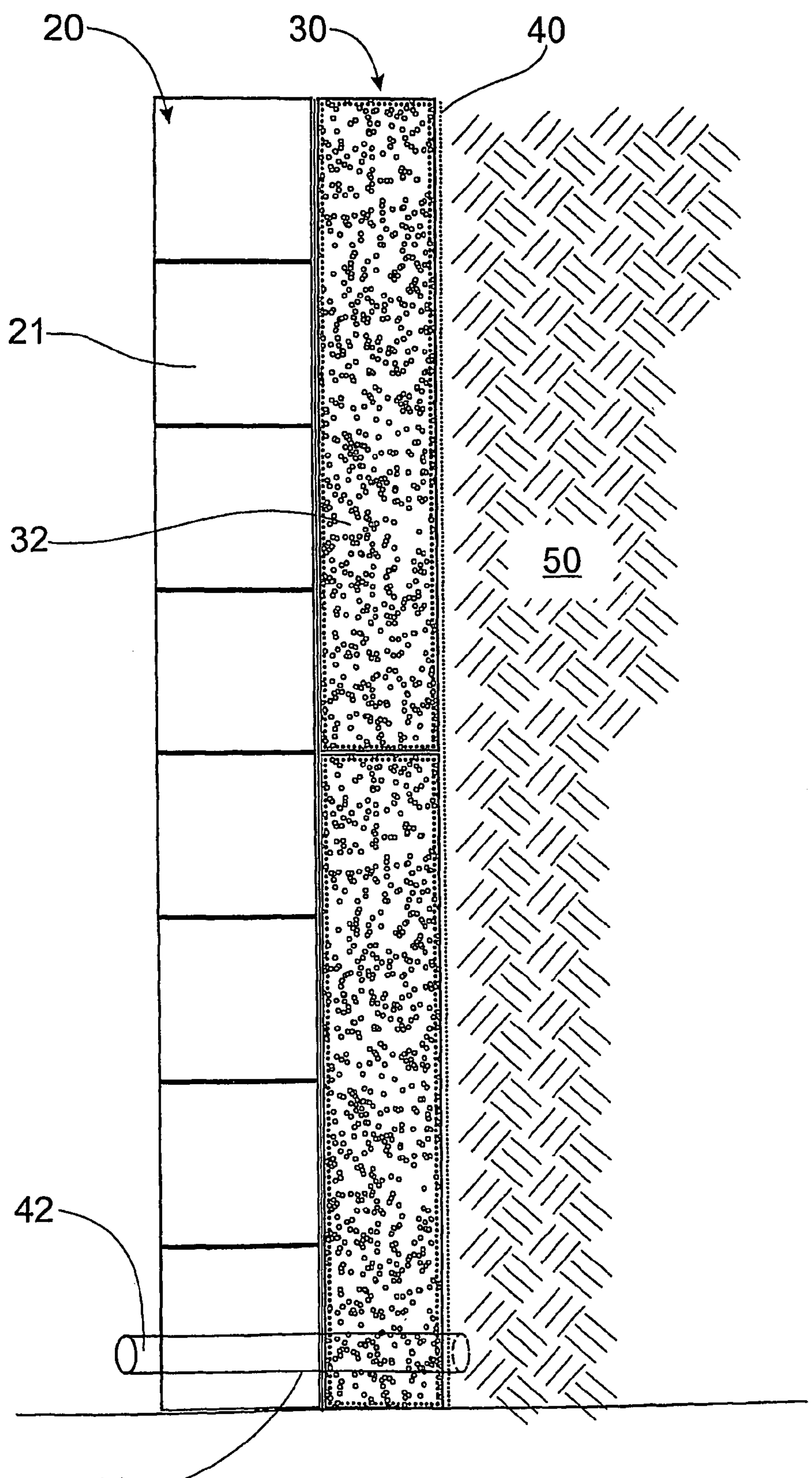
FIG. 3 is a sectional side view of a retaining wall according to a third embodiment of the invention.
Figure 4:
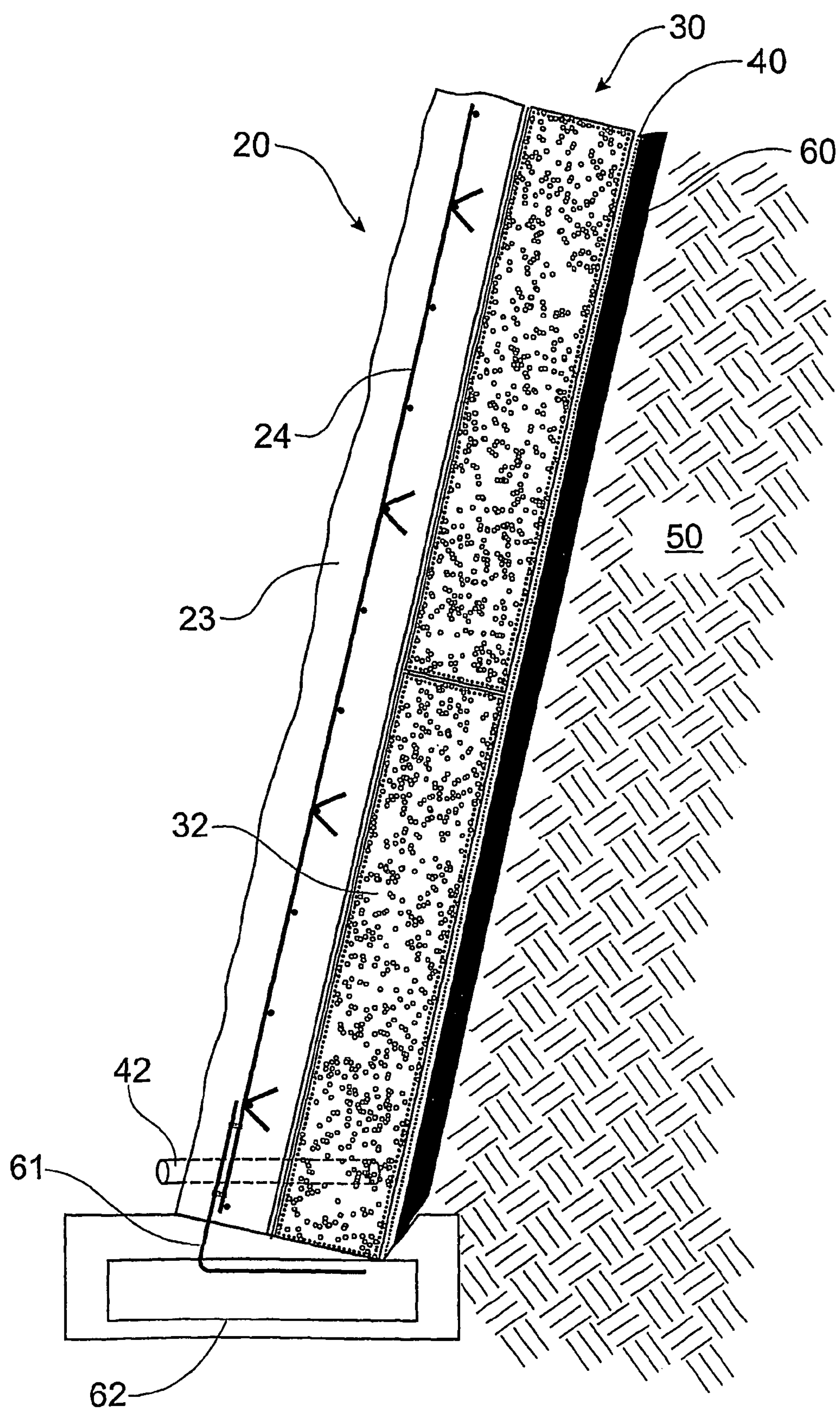
FIG. 4 is a sectional side view of a retaining wall according to a fourth embodiment of the invention.

FIG. 4 shows a similar embodiment of a retaining wall as that disclosed in FIG. 3. In this embodiment, the drainage panels 32 are the same. However, the concrete blocks 21 have been replaced by a concrete load-bearing wall 23. The load-bearing wall 23 was formed by spraying concrete (known as ShotCrete) over metal reinforcing 24. The metal reinforcing 24 is tied to metal reinforcing 61 located within a footing 62.

The sprayed concrete sticks directly onto the drainage panels 32 to produce a stronger retaining wall 10.

Gravel 60 has also been located between the geofabric and earth to assist in the flow of water through the earth and through the geofabric into the drainage panels 32.

Figures 5A, 5B:
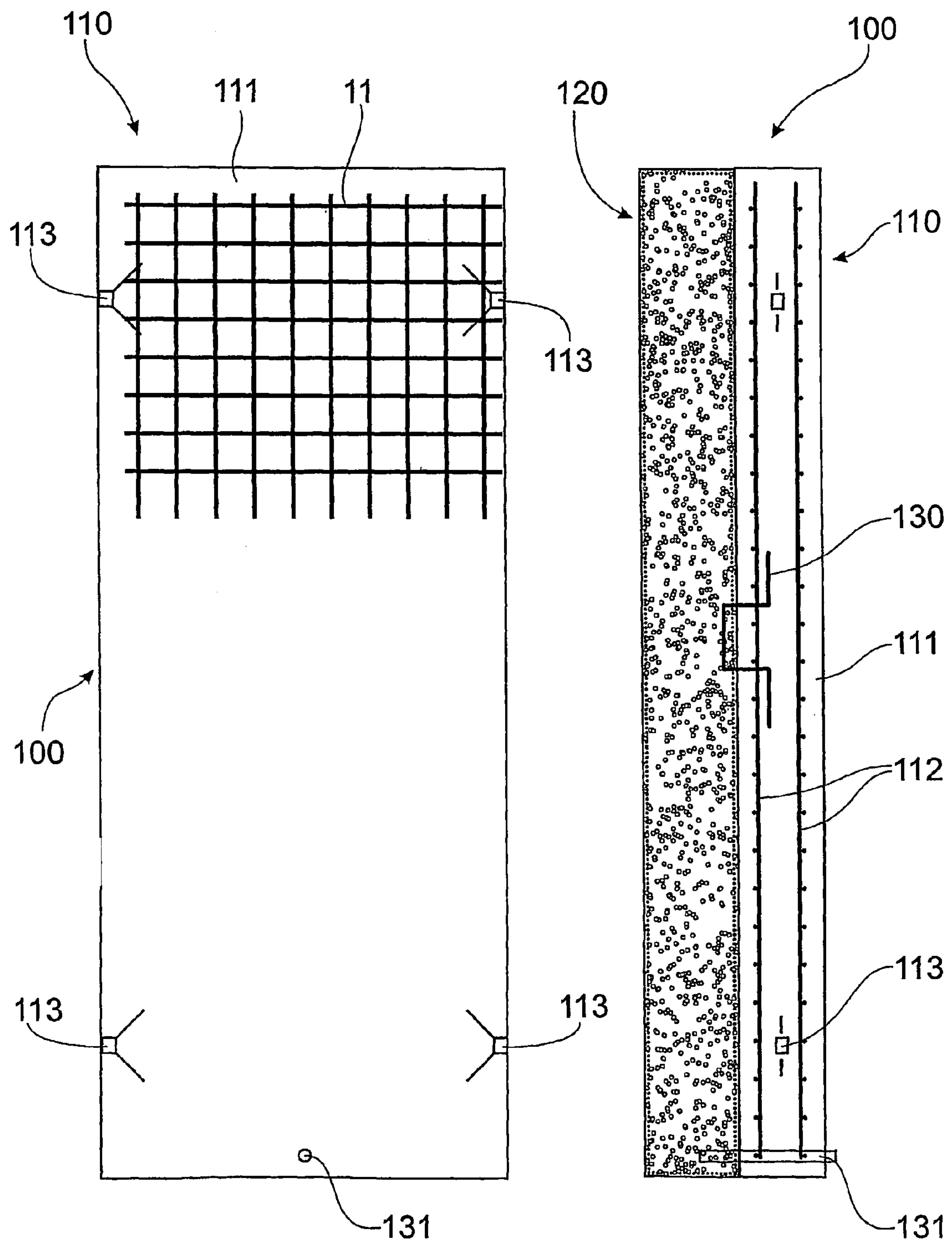
FIG. 5A is a top view a panel according to an embodiment of the invention.
FIG. 5B is a sectional side view a panel according to FIG. 5A.

FIGS. 5A and 5B shows a prefabricated panel 100 for a retaining wall comprising a load bearing section 110 and a drainage section 120.

The load bearing section 110 is constructed from concrete 111 that cover metal reinforcing 112. Lifting lugs 113 are located within the load bearing section so that the panel can be lifted into a desired location.

The drainage section is constructed from a drainage composition that uses the following ratio of components:

1200 kg/m$^3$ of 20 mm aggregate;
200 kg/m$^3$ of cement;
65 kg/m$^3$ of fly ash; and
0.35 kg/m$^3$ of fibrous material.

A metal tie 130 assists in holding the load beading section 110 and the drainage section 120 together. Geofabric (not shown) may be placed over the drainage section 120 if desired. A pipe 131 is placed through the load bearing section 110 into the drainage section 120.

The prefabricated panel 100 may be used to quickly and easily construct a retaining wall 100. After excavation of earth, the prefabricated panel 100 only needs to be fixed in position using a footing (not shown). The earth can then be back filled to produce a retaining wall.

Figure 6A:
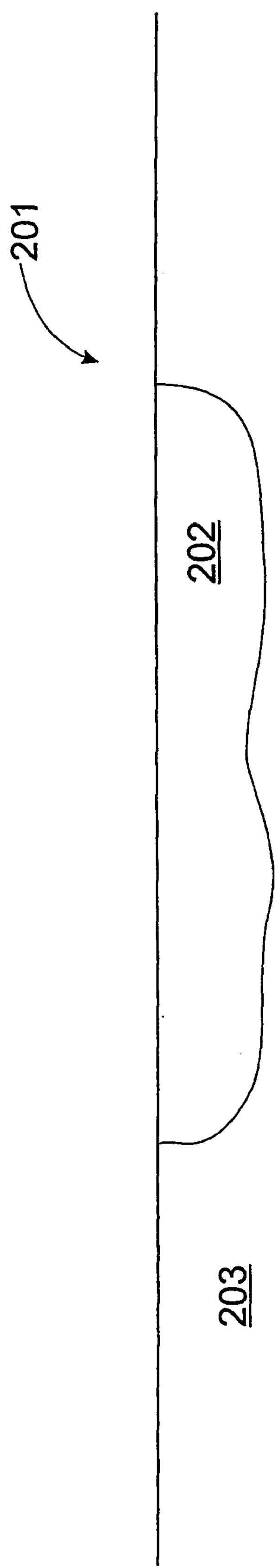
FIG. 6A is a sectional side view of a proposed roadway.

FIG. 6A shows a proposed location for a roadway 201. Along the proposed path is wet area 202 where water passes through the earth 203.

Figure 6B:
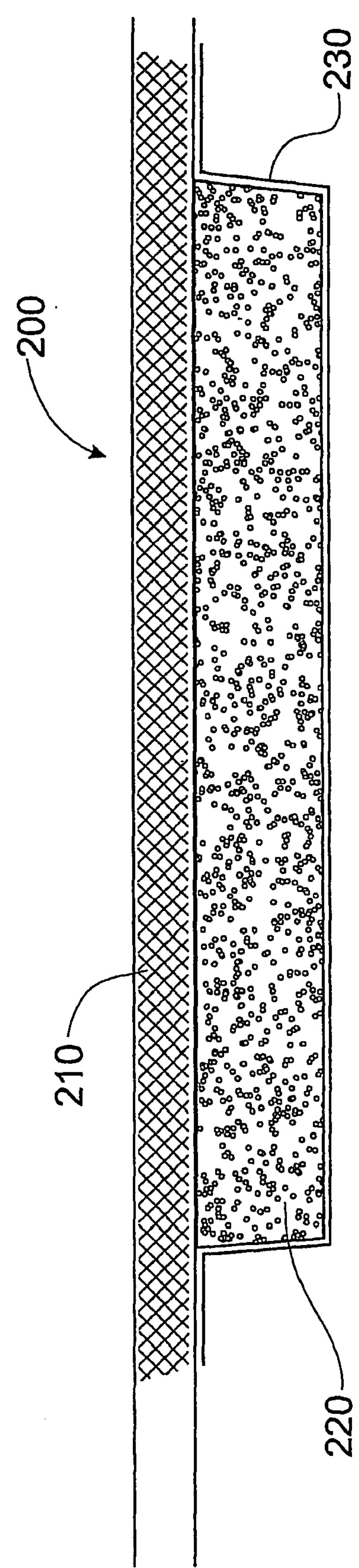
FIG. 6B is a sectional side view of a roadway according to an embodiment of the invention.

FIG. 6B shows the roadway 200, after completition, which extends through the wet area 203. The roadway 200 comprises an asphalt contact layer 210, drainage layer 220 and geofabric 230.

The asphalt contact layer 210 is standard road base. It should be appreciated that the asphalt contact layer 210 may be replaced with concrete depending on the amount of water that flows through the wet area.

The drainage layer 220 is constructed from a drainage composition that uses the following ratio of components:

1300 kg/m$^3$ of a mixture of 10 and 20 mm aggregate;
190 kg/m$^3$ of cement;
55 kg/m$^3$ of fly ash; and
0.55 kg/m$^3$ of fibrous material.

The roadway 200 is constructed by excavating earth 203 at the wet area 202. The geofabric 230 is then laid within the excavation. The drainage composition is then poured into the excavation until it covers the wet area 202 to form the drainage layer 220. The asphalt contact layer 210 is then laid on top of the drainage layer 220.

The drainage layer 220 allows water to pass through the wet area 202 without water passing through the surface of the asphalt contact layer 210. Hence, improved roadways 200 can be produced more efficiently and effectively.

Figure 7:
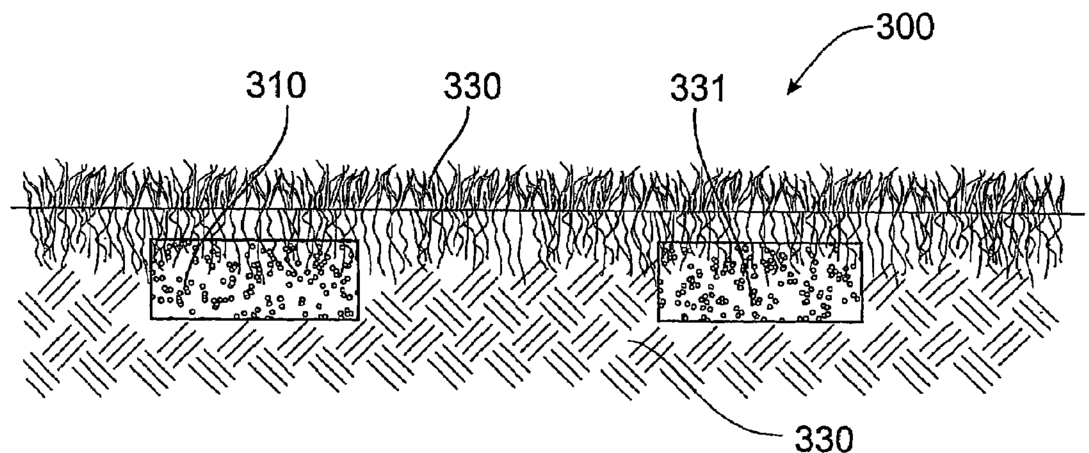
FIG. 7 is a sectional side view of an erosion prevention system according to an embodiment of the invention.

FIG. 7 shows an erosion prevention system 300 produced using the incorporated drainage blocks 310.

The drainage blocks 310 are produced from a drainage composition using the following ratio of components:

1250 kg/m$^3$ of 20 mm aggregate;
270 kg/m$^3$ of cement;
75 kg/m$^3$ of fly ash; and
0.5 kg/m$^3$ of fibrous material.

To produce the erosion prevention system, the drainage blocks 310 are buried within the soil 320. Grass seed is then spread on top of the soil 320. When the grass seed sprouts and commences growing, a root system 331 of the grass 330 penetrates the soil and also penetrates the drainage blocks 310 to complete the erosion prevention system. This rooting of the grass within the blocks 320 provides a firm anchor for the soil 320 and hence prevents erosion.

Figure 8:
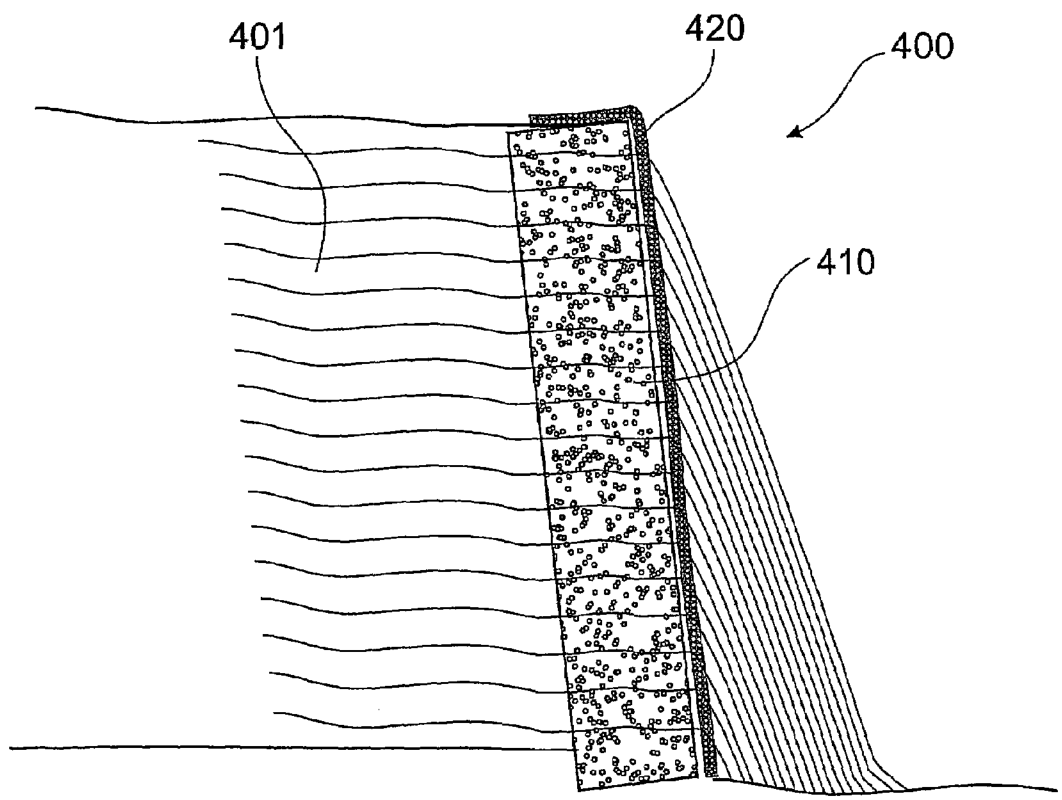
FIG. 8 is a sectional side view of a weir according to an embodiment of the invention.

FIG. 8 shows a weir 400 that is used to filter impurities from water used in industry such as in an oil refinery. The weir 400 includes a drainage wall 410 that is produced using a drainage composition that uses the following ratio of components:

1400 kg/m$^3$ of 30 mm aggregate;
210 kg/m$^3$ of cement;
35 kg/m$^3$ of fly ash; and
0.5 kg/m$^3$ of fibrous material.

The drainage wall 410 forms a dam. However, water 401 is allowed to pass through the drainage wall 410 at a constant flow rate determined by the ratio of components used in the drainage composition.

A filter material 420 is located over the drainage wall 410. The filter material 420 is used to capture impurities that are located within the water. A typical filter material is a geo-textile but other filter materials can be used. The filter material 420 is replaced after a predetermined period of time.

The weir 400 operates by allowing water to pass through the drainage composition. The water then must pass through the filter material 420 where the impurities are captured.

Figure 9:
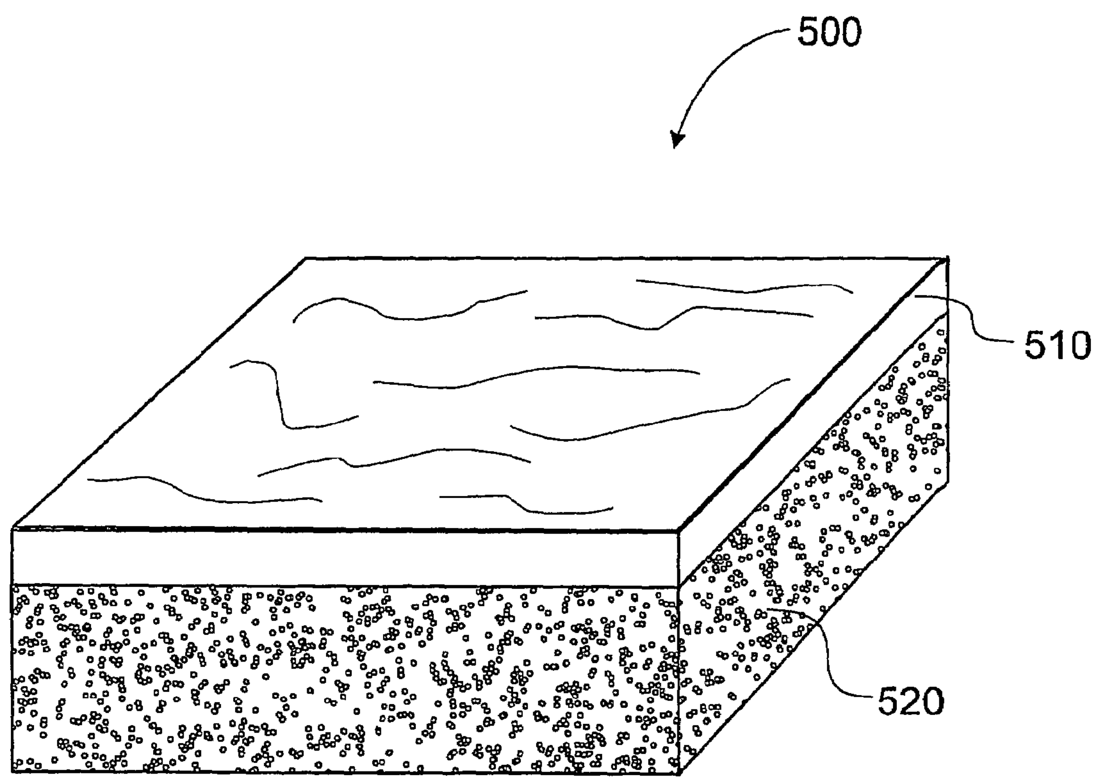
FIG. 9 is a perspective view of a block according to an embodiment of the invention.

FIG. 9 shows a paving block 500 having a face layer 510 and a drainage layer 520. The face layer 510 is made from concrete whilst the drainage layer 520 is made from a drainage composition that uses the following ratio of components:

1200 kg m$^3$ of 25 mm aggregate;
250 kg/m$^3$ of cement;
50 kg/m$^3$ of fly ash; and
0.4 kg/m$^3$ of fibrous material The paving block 500 is produced pouring concrete into a mould to form the face layer 510. Whilst the concrete is still wet, the drainage composition is pour on top of the concrete to form the drainage layer 520. The paving block 500 is then allowed to dry.

The paving block 500 is integrally formed and has improved drainage characteristics, as water is able to pass through the drainage layer of the paving block.

It should be appreciated that various other changes and modifications may be made to the embodiment described without departing from the spirit or scope of the invention.

The invention claimed is:

1. A drainage composition comprising:

1000 to 1500 kg/m$^3$ of aggregate;
100 to 350 kg/m$^3$ of cement;
35 to 100 kg/m$^3$ of fly ash; and
0.2 to 0.6 kg/m$^3$ of fibrous material.

2. The drainage composition of claim 1 wherein the size of the aggregate varies from between 10 mm and 75 mm.

3. The drainage composition of claim 1 wherein different sized aggregates are combined in the drainage composition.

4. The drainage composition of claim 1 wherein the volume of aggregate to fly ash is approximately 3:1.

5. The drainage composition of claim 1 wherein the fibrous material is a synthetic fibre.

6. The drainage composition of claim 5 wherein the synthetic fibre is a nylon fibre.

7. The drainage composition of claim 5 wherein the fibre is between 19 mm to 50 mm long.

8. The drainage composition of claim 1 wherein the drainage composition is fabricated into blocks or panels.

9. The drainage composition of claim 1 wherein sand is added to the composition.

10. The drainage composition of claim 9 wherein the weight of sand is between 40 to 200 kg/$^3$.

* * * * *